US008594075B2

(12) United States Patent
Elmasry

(10) Patent No.: US 8,594,075 B2
(45) Date of Patent: Nov. 26, 2013

(54) METHOD AND SYSTEM FOR WIRELESS VOIP COMMUNICATIONS

(75) Inventor: George F. Elmasry, Howell, NJ (US)

(73) Assignee: D & S Consultants, Inc., Eatontown, NJ (US)

( * ) Notice: Subject to any disclaimer, the term of this patent is extended or adjusted under 35 U.S.C. 154(b) by 369 days.

(21) Appl. No.: 12/952,318

(22) Filed: Nov. 23, 2010

(65) Prior Publication Data

US 2011/0064031 A1 Mar. 17, 2011

Related U.S. Application Data

(63) Continuation-in-part of application No. 11/518,705, filed on Sep. 11, 2006, now abandoned.

(60) Provisional application No. 60/793,043, filed on Apr. 19, 2006.

(51) Int. Cl.
*H04L 12/66* (2006.01)
*H04L 12/28* (2006.01)
*H04J 1/02* (2006.01)
*H04B 1/66* (2006.01)

(52) U.S. Cl.
USPC ....... 370/352; 370/401; 370/493; 375/240.27

(58) Field of Classification Search
None
See application file for complete search history.

(56) References Cited

U.S. PATENT DOCUMENTS

| | | | |
|---|---|---|---|
| 5,870,412 A * | 2/1999 | Schuster et al. ............ | 714/752 |
| 6,119,179 A | 9/2000 | Whitridge et al. | |
| 6,549,886 B1 | 4/2003 | Partalo | |
| 6,728,924 B1 | 4/2004 | Lou et al. | |
| 6,757,823 B1 | 6/2004 | Rao et al. | |
| 6,785,261 B1 | 8/2004 | Schuster et al. | |
| 6,792,534 B2 | 9/2004 | Medvinsky | |
| 6,813,264 B2 | 11/2004 | Vassilovski | |
| 6,836,804 B1 | 12/2004 | Jagadeesan | |
| 6,876,727 B2 | 4/2005 | Reynolds | |
| 6,888,801 B1 | 5/2005 | Hock | |
| 6,970,450 B1 | 11/2005 | Scott | |
| 6,981,193 B2 | 12/2005 | Park | |
| 6,990,112 B1 | 1/2006 | Brent et al. | |
| 7,603,408 B1 * | 10/2009 | McGinnis et al. ............ | 709/203 |
| 7,631,183 B2 | 12/2009 | Brown et al. | |
| 2002/0057675 A1 * | 5/2002 | Park .......................... | 370/352 |
| 2004/0151158 A1 | 8/2004 | Gannage et al. | |
| 2006/0059537 A1 * | 3/2006 | Alvermann et al. ............ | 726/1 |
| 2009/0213845 A1 | 8/2009 | Li | |

OTHER PUBLICATIONS

Jung, et al., Performance Evaluation of Two Layered Mobility Management using Mobile IP and Sessions Intiaition Protocol, IEEE, Globecom, 2003, pp. 1190-1194, vol. 3, No. 3.

(Continued)

*Primary Examiner* — Ayaz Sheikh
*Assistant Examiner* — Sori Aga
(74) *Attorney, Agent, or Firm* — Fox Rothschild LLP; Dennis M. Carleton

(57) ABSTRACT

Methods, an apparatus, and a system for communications using multiplexed packets including payloads of the current and at least one preceding packet are disclosed. The invention is able to implement both robustness and a degree of compression while still being able to operate in environments of limited bandwidth having high rates of packet loss, such as in wireless VoIP networks.

14 Claims, 5 Drawing Sheets

(56) References Cited

OTHER PUBLICATIONS

Iannello et al., Experimental Analysis of Heterogeneous Wireless Networks, WWIC, 2004, pp. 153-164, Springer-Verlag Berlin Heidelberg.

Darmani et al., New Methods for Lost Voice Packet Recovery in Active Networks, IEEE, 2003, pp. 57-62, Adelaide Australia.

Seo et al., Codec Mode Assignment Algorithm for Voice Over IP with AMR Speech Codec, Aug. 2002, pp. 375-378, Kaua'i, Hawaii, USA.

Nelson et al., Implementation of Hierarchical Mobile IPV6 for Linux, The British Library, pp. 289-299.

Komaki et al., A Packet Loss Concealment Technique for VoIP Using Steganography, IEICE Trans. Fundamentals, vol. E86-A, No. 8, Aug. 2003, pp. 2069-2072.

Kim et al., A Dynamic Redundant Audio Transmission in VoIP Systems, IEICE Trans. Commun., vol. E86-B, No. 6, Jun. 2003, pp. 2056-2059.

Rodbro et al., Compressed Domain Packet Loss Concealment of Sinusoidally Coded Speech, IEEE, ICASSP, 2003, pp. 104-107, Aalborg, Denmark.

Daniel et al., Sensitivity of MIL-STD-3005 MELP to Packet Loss in IP Networks, IEEE, 2002, pp. 77-80, Stillwater, Oklahoma, USA.

Rodbro et al., Time-Scaling of Sinusoids for Intelligent Jitter Buffer in Packet Based Telephony, IEEE, 2002, pp. 71-73, Aalborg, Denmark.

Chao, et al., A Low Latency Handoff Algorithm for Voice over IP Traffics in the Next Generation Packet-Based Cellular Networks: Cellular Mobile IPv6, Wireless Personal Communications 23:353-378, 2002, Kluwer Academic Publishers, The Netherlands.

\* cited by examiner

METHOD AND SYSTEM FOR WIRELESS VOIP COMMUNICATIONS

RELATED APPLICATIONS

This application is a continuation-in-part of co-pending U.S. application Ser. No. 11/518,705, filed 11 Sep. 2006, and published as U.S. Published Patent Application 2008/0062987.

FIELD OF THE INVENTION

The present invention generally relates to the field of digital communications and, in particular, to wireless Voice-Over-Internet-Protocol ("VoIP") communications over High Assurance Internet Protocol Encryption (HAIPE) encrypted core networks having limited bandwidth and high rates of packet losses, such as could be found in a military theater of operation.

More particularly, the present invention can reduce the amount of bandwidth needed over the encrypted core for a given application, such as VoIP (compression) and can recover lost packets in real-time, to produce acceptable quality voice even with high rates of packet loss (robustness). Further, the invention is able to seek the sweet spot between compression and robustness based on the status of the encrypted core network (e.g. real time packet loss ratio), and can therefore provide acceptable quality of service even with high packet loss and/or limited bandwidth at the encrypted core network.

BACKGROUND OF THE INVENTION

Military networks with HAIPE encryption and commercial networks with IPSec encryption may have communications links at the encrypted core that exhibit high rates of packet losses or can only provide limited bandwidth for VoIP applications. As such, the performance of VoIP applications may fall below acceptable levels.

For tactical wireless ad-hoc IP based networks, links can have limited bandwidth and may be unreliable because they can suffer from intermediate periods of fading, causing large packet loss. As a result, the performance of VoIP communications running on these networks may become degraded. This raises the need and desire to boost the performance of these applications such that VoIP decoders see less packet loss than is actually introduced by the network. In addition, because there is a low payload to overhead ratio for each packet transmitted over the network, it would be desirable to provide robustness without increasing the number of packets entering the encrypted core network. Moreover, reducing the number of packets entering the core network, referred to herein as compression, is desirable, when possible, to overcome the limited bandwidth of the encrypted core links.

VoIP boosting and compression techniques for tactical networks need to consider the effects and constraints of HAIPE. In such wireless VoIP networks, packet losses may be caused by, for example, the movement of the transmitting or the receiving terminals, electromagnetic interference, changes in environmental conditions, and other such factors. In networks utilizing HAIPE, in which packet size is substantially increased as a result of the encryption, the decryption technique checks for bit error. If any error in the packet is discovered, HAIPE drops the entire packet. In such encryption systems, packets with any missing or corrupted data are intentionally dropped or discarded by the encryption protocol, resulting in significantly higher packet losses than would occur without encryption. As a result, this behavior causes a HAIPE-encrypted VoIP network to introduce more packet loss to the VoIP stream. Moreover, because packet size substantially increases as the result of encryption, and because core network wireless links may have limited bandwidth, reducing the number of packets entering the core network is a key in achieving substantial compression over HAIPE.

VoIP "boosting techniques" (for robustness and compression) for tactical networks must be able to deal with the effects and constraints that such encryption techniques and limited bandwidth of wireless links impose on packet transfer.

Various error cancellation methods and forward error correction (FEC) techniques have been used to decrease unrecoverable losses or corruption of the packets entering a wireless VoIP network as described in, for instance, U.S. Pat. No. 6,785,261 issued to Schuster, et al. on Aug. 31, 2004 entitled "Method and system for forward error correction with different frame sizes," the contents of which are hereby incorporated by reference. Other correction methods include relying on interpolating a missing packet based on adjacent packets as described in, for instance, U.S. Pat. No. 6,981,193 issued to Park on Dec. 27, 2005 entitled "Internet telephone and method for recovering voice data lost therein," the contents of which are hereby incorporated by reference.

Various VoIP compression techniques are available in the literature and commercial applications that rely on reducing the bits/second rate of the encoded voice, which reduces the payload size of VoIP packets (e.g., the G.729 codec versus the G.711 codec). Tactical networks have more unique characteristics that require a different type of boosting (i.e., robustness and compression). This invention does not preclude the use of Forward Error Correction ("FEC") at the wireless links or the use of compressed VoIP codecs. This invention performs VoIP boosting at the IP layer and works on IP packets before encryption and after decryption.

However, despite the considerable effort in the art devoted to development of reliable wireless VoIP communications, further improvements would be desirable, especially considering the need for a compromise between robustness and compression over HAIPE encrypted networks.

SUMMARY OF THE INVENTION

One important advantage of the present invention, as demonstrated below, is that it achieves robustness without the need to increase the number of packets entering the encrypted core network. Moreover, the present invention can reduce the number of packets entering the encrypted core (i.e., to achieve compression over HAIPE) and can seek the "sweet spot" between robustness and compression over HAIPE, which is largely dependent upon the packet loss rate of the network. This is an important consideration for HAIPE-encrypted networks, where the ratio of payload to overall packet size is small (i.e., as low as 20/136). The present invention expands the packet size over the encrypted core by increasing the payload size without an increase in overhead, thereby providing redundancy in the payloads which can be used to reduce the actual number of payloads entering the encrypted core.

One aspect of the invention is a method of information transfer in a packet-switched network using multiplexed packets, defined herein as data packets having a payload field which consists of the payload of the current packet and the payload of at least one preceding packet, and preferably, the payloads of multiple preceding packets, wherein the term "packet" as used here refers to a single payload and header from the application. At a receiving terminal, the payload fields of the multiplexed packets are separated and their corresponding packets (consisting of a payload and header) are reconstructed and selectively forwarded to a recipient application. This aspect of the invention creates robustness where packets lost due transmission errors over the encrypted core network are recovered and constructed from multiplexed packets having redundant payloads.

In another aspect of this invention, the transmitting terminal may selectively drop some multiplexed packets (i.e., these multiplexed packets are prevented from being transmitted over the encrypted core) because the receiving terminal will be able to construct the packets contained in the selectively dropped multiplexed packet from the received preceding or succeeding multiplexed packet. This aspect of the invention creates compression by reducing the number of packets entering the encrypted core at the transmitting side. Given the amount of packet overhead that HAIPE encryption introduces, a significant compression ratio is achieved through this aspect of the invention.

Another aspect of this invention involves a method of digital communications comprising monitoring the encrypted core path packet loss characteristics. Based on real-time collected statistics of packet loss rates, the invention can decide the level of robustness or compression needed to optimize the encrypted core resource management and achieve the desired quality of service.

For example, if the encrypted core path packet drop rate is very low or zero, the invention can maximize the effect of the compression capability by including more payloads from previous packets and intentionally dropping more packets at the transmitting terminal to maximize the reduction in the number of packets entering the encrypted core to the lowest number that gives the user acceptable quality of service.

On the other hand, if the encrypted core path packet drop rate is very high, the invention exploits the robustness capability of the invention by including more payloads from previous packets and transmitting more packets, and relies on the receiving terminal to reconstruct as many lost packets as possible.

Further, the invention is capable of reaching the sweet spot between compression and robustness based on the real time measurements of packet loss at the encrypted core path.

Other aspects of the present invention provide terminals and systems for wireless VoIP communications implementing the inventive methods and computer readable mediums storing software that performs these methods.

This summary is neither intended nor should it be construed as being representative of the full extent and scope of the present invention, which these and additional aspects will become more readily apparent from the detailed description, particularly when taken together with the appended drawings.

DETAILED DESCRIPTION OF THE INVENTION

Herein, the present invention is illustratively discussed in the context of wireless VoIP systems. However, as readily appreciated by those skilled in the art, in other embodiments, the invention may advantageously be used in wired and fiber-optic terrestrial or undersea networks supporting packet-based voice or data communications, as well as in the networks having a combination of wireless, wired or fiber-optic links, and further including free space optical communication networks, such as a laser-based communication network. In addition, although the following description talks about the invention in terms of its use with VoIP applications, it is to be understood that the invention may also be used with applications other than VoIP.

Figure 1:
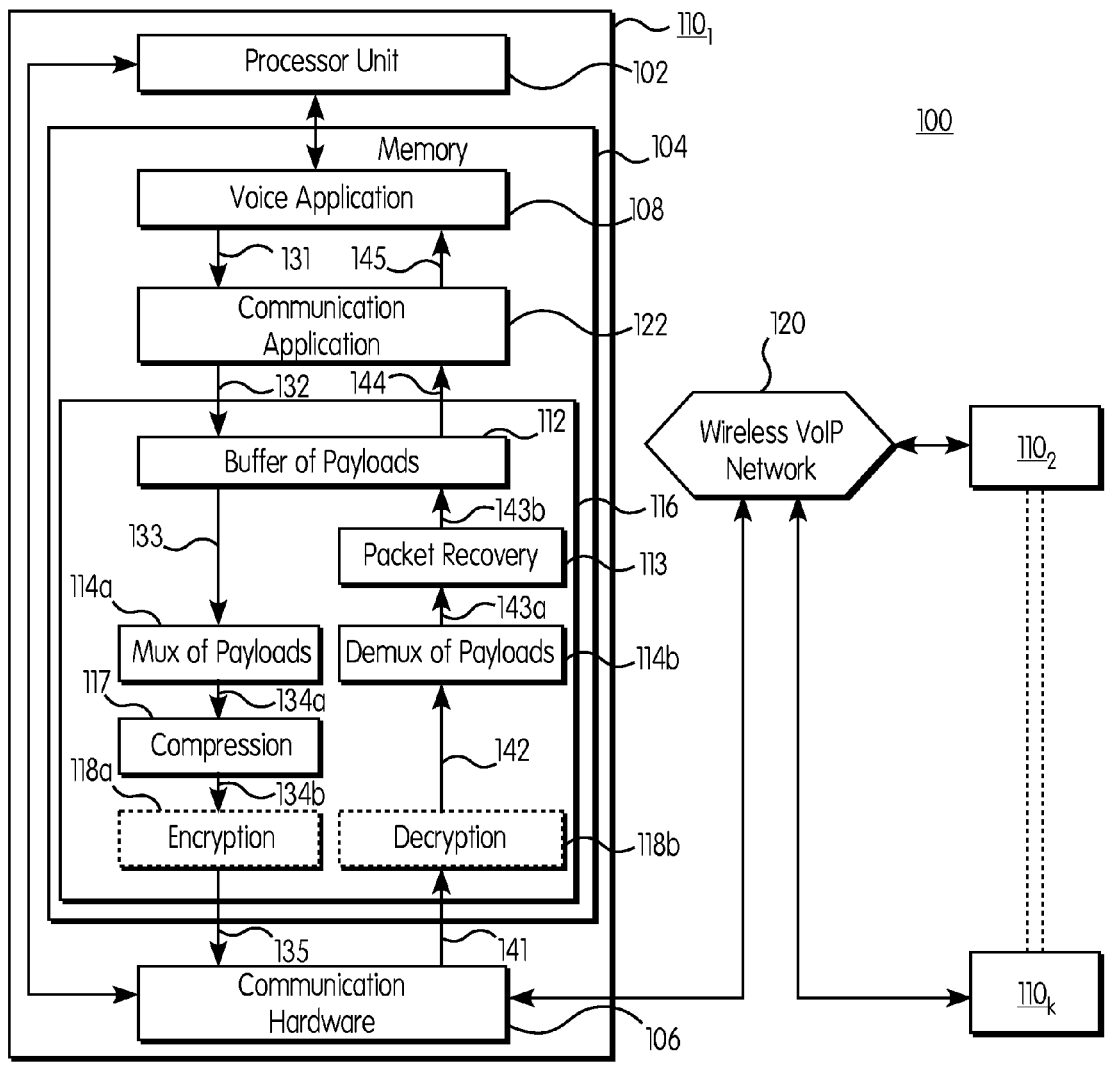
FIG. 1 is a high-level, schematic diagram depicting a wireless VoIP system in accordance with one embodiment of the present invention.
Figure 2:
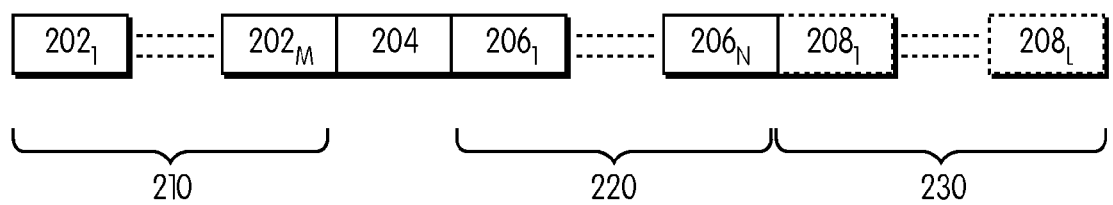
FIG. 2 is a schematic diagram illustrating a structure of a multiplexed packet used in the system of FIG. 1 to add robustness to the system.
Figure 3:
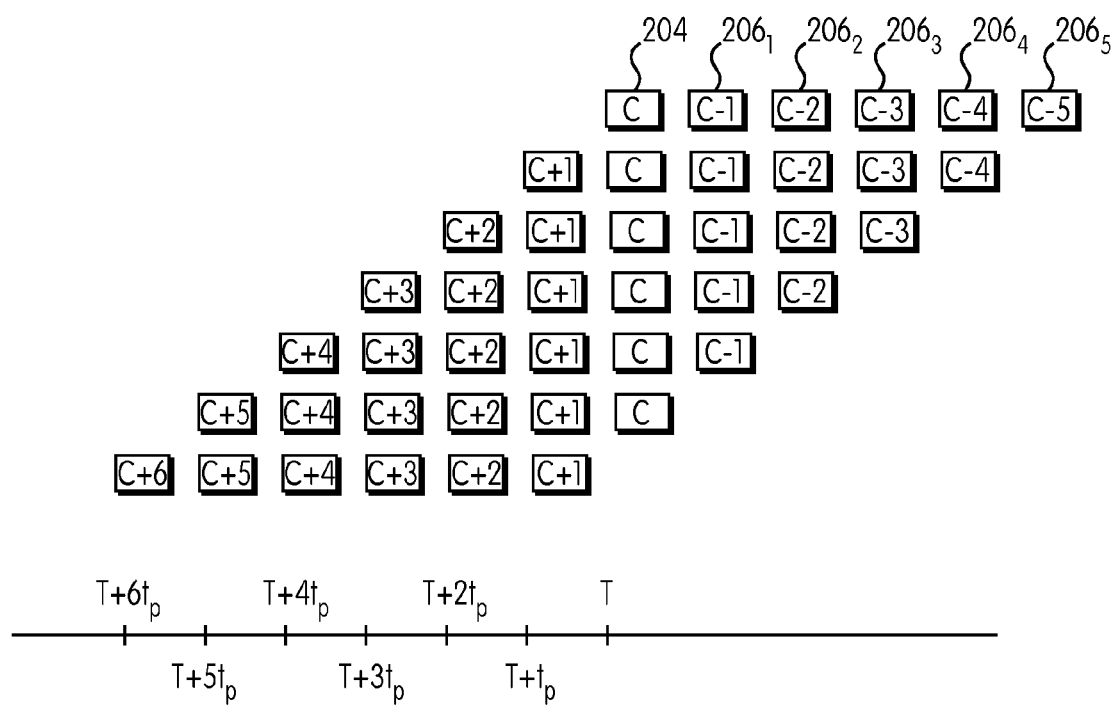
FIG. 3 is a diagram showing transmission over time of the multiplexed packets of FIG. 2, showing the compression aspect of the invention.

FIG. 1 is a high-level, schematic diagram depicting a wireless VoIP communication system 100 implementing one embodiment of the present invention, and FIG. 2 is a schematic diagram according to a first aspect of the invention illustrating a structure of a multiplexed packet used in system 100. FIG. 3 is a time-based diagram showing transmission of multiplexed packets according to a second aspect of the invention. For best understanding of these aspects of the invention, the reader should refer simultaneously to FIGS. 1 and 2, and FIGS. 1 and 3.

The system 100 comprises a plurality of terminals $110_1$-$110_K$ (K is an integer, and K≥2) and a wireless VoIP network 120. The terminals 110 may be stationary or mobile terminals. In the depicted embodiment, the terminals 110 are shown as integrated transmitting/receiving terminals. Alternatively, or additionally, the system 100 may also comprise specialized transmitting or receiving terminals (not shown).

The system 100 supports wireless VoIP communications, which are performed between the terminals 110 in the form of discrete packets. In operation, the packets are transmitted between the terminals 110 over wired or wireless links. In one embodiment, the system 100 illustratively uses a time division multiple access (TDMA) communication protocol, however, use of other communication protocols (for example, code division multiple access (CDMA) communication protocol) is contemplated and is within the scope of the present invention. In some embodiments, the network 120 and terminals 110 may use more than one communication protocol.

The terminal 110 may contemporaneously function as a transmitting terminal for some voice messages (e.g., requests of information) or a receiving terminal for other messages (e.g., responses to such requests), thereby supporting half-duplex or duplex wireless VoIP communications. As such, herein the terms "transmitting terminal" and "receiving terminal" may interchangeably be used in reference to (i) the same terminal transmitting and receiving different messages or (ii) different terminals, one of which is a source and the other is a recipient of the same message.

In one embodiment, a terminal 110 comprises a processor unit 102, a memory 104, and communication hardware 106. The processor unit 102 is coupled to the memory 104 and communication hardware 106. The memory 104 contains a plurality of programs which, when executed by the processor unit 102, facilitate operability of the terminal 110. In particular, memory 104 comprises a voice application 108, a communications application 122, and a payload processing module 116.

Packet processing module 116 generally includes components to process both outgoing and incoming data streams. Outgoing packets are buffered in buffer 112, and payloads from multiple consecutive packets are combined by multiplexer 114a to create multiplexed packets with payloads from multiple preceding packets. Multiplexed packets are then compressed by compression module 117 and optionally encrypted by encryption module 118a. Incoming data streams are first optionally de-encrypted by decryption process 118b, multiplexed packets are processed by de-multiplexer 114b, and the de-multiplexed payloads are used to create lost packets (payload and headers) by packet recovery module 113.

As will be realized by one of skill in the art, at least some elements of the packet processing module 116 may be realized in hardware. However, in preferred embodiments of the invention, the payloads are processed at an IP layer of the terminal 110 (as shown in FIG. 1) or, alternatively, at an IP layer of a network edge (discussed in reference to FIG. 4 below). In addition, alternatively, at least some elements of the encryption module 118a and decryption module 118b may be realized in hardware.

In operation, voice application 108 digitizes outgoing voice messages and defines the payloads of the packets used to transmit these messages, as well as de-digitizes the content of payloads of the received packets. The communication application 122 facilitates transmission of the outgoing packets and reception of the incoming packets. The communication hardware 106 collectively corresponds to physical means of the terminal 110 facilitating wireless VoIP communications and includes transmitters, receivers, and operator controls, among other devices. Arrows 131, 132, 133, 134a, 134b and 135 and 141-145 illustrate the directions of signal flows in the terminal 110 during the transmitting phase of operation and arrows 141, 142, 143a, 143b, 144 and 145 illustrate the directions of signal flows in the terminal 110 during the receiving phase of operation. FIG. 1 is illustrative of an embodiment of the invention as incorporated into a network system. It is readily apparent to those skilled in the art that the system of FIG. 1 may be illustrated in different configurations having the same functionality.

FIG. 2 is a schematic diagram illustrating a structure of multiplexed packet 200 in accordance with a first aspect of the invention, which is used in system 100. Multiplexed packet 200 comprises a plurality 210 of header fields $202_1$-$202_M$, a payload field (i.e., voice data field) 204 containing the payload from the current packet, a plurality 220 of fields $206_1$-$206_N$ each containing a copy of a payload of one of preceding packet, and an optional plurality 230 of system fields $208_1$-$208_L$, where M, N, and L are integers greater than or equal to 1. In the first N packets of a data train corresponding to a respective voice message, some of the fields $206_1$-$206_N$ relate to non-existing preceding packets and, therefore, may be left blank or contain predetermined symbols or data.

In some embodiments, the multiplexed packet 200 may include, for example, a plurality of headers 210 comprising IP (Internet) and UDP (User Data Protocol) headers, the payload field 204 and the fields $206_1$-$206_N$. In embodiments that use data encryption techniques (e.g., High Assurance Internet Protocol Encryption (HAIPE)), the structure of the header fields $202_1$-$202_M$ is generally more complex and, additionally, the multiplexed packet 200 typically includes the system fields $208_1$-$208_L$.

Using the payload processing module 116, which, in a preferred embodiment operates at the IP layer, terminal 110 may process outgoing packets wherein the payload fields include a field containing payload of a currently processed packet (field 204) and a pre-determined number of fields containing copies of payloads of most recent preceding packets (fields $206_1$-$206_N$). This is achieved by temporarily storing in buffer 112 copies of the payloads of packets preceding the currently processed packet and then, using the multiplexer 114a, combining them with the payload of the current packet. In one embodiment, the payloads of the current and preceding packets are multiplexed at an IP layer of the terminal 110 (as shown in FIG. 1) or, alternatively, at an IP layer of a network edge (discussed in reference to FIG. 4 below). To achieve the compression aspect of the invention, a subset of the multiplexed packets 200 will be selected for transmission by compression module 117 and the rest will be discarded. The selection of which multiplexed packets 200 to transmit is based on both the value of N and the current packet loss rate of the network, as will be discussed in detail below.

Generally, with a VoIP application, header and system fields have substantially greater bit lengths (i.e., bit counts) than the payload fields. For example, a typical payload field comprises 20 bytes of data, whereas the header and system fields may occupy from 40 bytes (IP version 4, without encryption) to 136 bytes (IP version 4 with HAIPE). Systems have been proposed in which a transmitting node may append to each data packet redundant copies of the preceding K number of data packets, as described in, for instance U.S. Pat. No. 6,785,261 issued to Schuster, et al. on Aug. 31, 2004 entitled "Method and system for forward error correction with different frame sizes." In this way, the receiving end may readily recover a lost packet Di from one of the k subsequent packets $D_{i+1} \ldots D_{i+k}$. As more preceding packets are concatenated with each current packet in the stream, the network can tolerate a higher rate of packet loss. Although such redundant packets systems may be tolerable in low security systems, where the payload field and the header and system fields are of comparable size, they become extremely inefficient if used with encrypted networks such as, a HAIPE network, where the payload field is a relatively small fraction of the total packet. In such encrypted networks, it is highly advantageous to use an embodiment of the present invention in which only the payload fields of the preceding packets are multiplexed into the current packet. This requires multiplexing/demultiplexing the payloads at the packet assembly and disassembly stages using the payload recovery application 116. This multiplexing of the current and preceding payloads, however, has a limited effect on the bit lengths of the packets, duration of a time intervals needed for their transmission or reception, or information bandwidth of the system 100, even in encrypted networks such as a HAIPE network.

The multiplexed packets 200 selected to be transmitted after being optionally encrypted using the encryption module 118a, are transmitted, usually wirelessly, and, as such, enter network 120. A copy of the payload of each packet is stored in buffer 112, where it replaces the copy of the payload of the least recent packet in the same data stream. As such, during transmission of packets corresponding to a respective voice message, each packet contains its own payload and copies of payloads from a pre-determined number of packets created immediately prior to that packet.

The wireless VoIP system 100 may operate under conditions causing interference, delays, jitter, or other factors degrading temporal performance of communication links of the system, and some transmitted packets (e.g., packets transmitted by the terminal $110_K$) may be lost, i.e., not received by the intended recipient (e.g., terminal $110_1$) or unrecoverably corrupted, as may especially occur in a network utilizing data encryption techniques, such as HAIPE, which discards missing or corrupted data. In the system 100, when a received multiplexed packet 200 is separated or de-multiplexed at a receiving terminal (e.g., terminal 110₁), copies of payloads of preceding packets may be used to recover, with some delay, the payload of the missing packets.

The number of payloads from preceding packets (i.e., number of the fields $206_1$-$206_N$) in multiplexed packet 200 is determined based on a statistically or otherwise defined (e.g., measured) rate of packet loss in system 100. Generally, from 1 to 3-5 or more copies of such payloads may be combined or multiplexed with the current payload of the outgoing multiplexed packet 200. In operation, depending on the experienced rate of the packet loss, the number of payloads in multiplexed packet 200 may be changed. In particular, more payloads from the preceding packet's copies may be included in an outgoing multiplexed packet 200 when a high rate of packet losses is detected in a specific wireless link of the system 100.

The value of N can also be varied to support the second aspect of the invention, compression, as discussed below. Generally, the higher the value of N, the higher the potential compression gain in the system. However, there is a practical limit to the number of redundant payloads N that can be included in any single multiplexed packet 200. It has been found through experimentation that the optimal number for N for VoIP applications using current codecs is 5, such that each multiplexed packet 200 includes the current payload and 5 preceding payloads. This is because, with the current codecs for VoIP applications, when a packet containing 6 payloads is received at the receiving end, all 6 payloads are emitted at once, thus causing the jitter buffer of the codec to conclude that there is a high rate of delay variations in the system and to attempt to adjust by increasing the constant delay to absorb this high delay variation. This tends to cause more delay in the voice being received at the receiving end. When N is increased higher than 5, the induced delays become such that the voice quality on the receiving end begins to degrade to a noticeable degree. It may be possible, if a VoIP codec that can adapt to much higher delay variations is used, or if a VoIP user can tolerate higher delay, that N can be increased to more than 5. Also, if another application is being used that is less sensitive to delay (such as streaming voice), N could be increased to a much higher value, thereby introducing more robustness and compression capabilities into the system, as discussed below with respect to the compression aspect of the invention.

At a receiving terminal, after a multiplexed packet 200 of a received wireless signal is decrypted by the decryption module 118b, the voice data fields of the multiplexed packet 200 (i.e., fields 204 and $206_1$-$206_N$) are separated by demultiplexer 114b. In payload recovery module 113, the headers of the received packet are used to generate headers for each extracted payload to re-create the exact packets generated by voice application 108. For example if N equals 5, the received multiplexed packet 200 can be separated into 6 VoIP (original codec) packets. Headers are reconstructed by copying the received header and changing some fields accordingly (e.g., packet sequence number, recalculated CRC, etc.). This reconstruction of headers is done for each of the 5 regenerated VoIP packets. Also received multiplexed packet 200 is modified. The extra 5 payloads are removed and the CRC is recalculated. Individual, reconstructed packets are then forwarded to voice application 108. In addition, packet recovery module 113 will discard duplicate packets.

FIG. 3 shows the compression aspect of the invention. Compression is achieved by withholding transmission of selected multiplexed packets 200 and allowing the receiving terminal to reconstruct the original VoIP packets after de-multiplexing the received multiplexed packets 200. The multiplexed packets 200 which are selected to be withheld are determined by compression module 117 and are based on the rate of packet loss and the value of N.

FIG. 3 shows the data packets that would be transmitted when no compression is being used and when N=5. It can be seen that, at time T, a multiplexed packet 200 containing the current payload 204 and 5 previous payloads $206_1$-$206_5$ is transmitted. The current payload 204 is labeled as C while previous payloads $206_1$-$206_5$, are labeled as C−1, C−2, C−3, C−4 and C−5 respectively. At time T+$t_p$ (where $t_p$ represents the packetization time of the VoIP codec, usually 20 milliseconds), the next multiplexed packet 200 is sent. This multiplexed packet 200 contains as current payload 204, labeled as C+1 and the redundant payloads $206_1$-$206_5$ are C, C−1, C−2, C−3 and C−4. Note that payload C−5 has been dropped and will no longer be transmitted. The next multiplexed packet 200, transmitted at time T+2$t_p$, has as current payload 204 the payload labeled C+2, with the redundant payloads $206_1$-$206_5$ being C+1, C, C−1, C−2 and C−3, with payload C−4 being dropped. This continues down to time T+6$t_p$ where the current payload 204 would be C+6 and the redundant payloads $206_1$-$206_5$ would be C+5, C+4, C+3, C+2 and C+1.

It can be seen from this diagram that, in the absence of packet loss, that is, every multiplexed packet 200 which is transmitted is being received at the receiving terminal, the multiplexed packet 200 having payloads C+1, C+2, C+3, C+4 and C+5 as current payload 204 could be selected for withholding (that is, not transmitted), and original VoIP packets corresponding to the withheld packets could still be easily recovered at the receiving terminal from the multiplexed packets 200 having payloads C and C+6 as current payload 204, that is, only 1 of every 6 multiplexed packets 200 need be transmitted. Thus, in the case where the packet loss rate is zero, 5 out of every 6 multiplexed packets 200 can be eliminated, resulting in a high compression gain. It can be seen that the number of multiplexed packets 200 which can be eliminated is dependent on the value of N, the redundant number of payloads in each multiplexed packet 200. In general, the highest compression gain can be achieved when only 1/N+1 multiplexed packets 200 are transmitted.

If, however, some multiplexed packets 200 are lost for whatever reason, reducing the number of multiplexed packets 200 that are withheld from transmission will provide the robustness necessary to recover the packets at the expense of reduced compression gain. Thus, there is a trade-off between compression and robustness. For example, if two out of every three multiplexed packets 200 are not transmitted, the receiving VoIP terminal will still receive each original VoIP packet even if every other multiplexed packet 200 is lost, that is, with a 50% selective packet drop rate two out of three multiplexed packets 200 can be eliminated from transmission and each original VoIP packet will still be received at the receiving terminal (when N=5).

Therefore, in the example in FIG. 3, if multiplexed packets 200 are sent at times T, T+3$t_p$ and T+6$t_p$, and the multiplexed packets 200 for times T+$t_p$, T+2$t_p$, T+4$t_p$ and T+5$t_p$ are withheld, if the multiplexed packet 200 transmitted at time T+3$t_p$ is lost, it can be seen that we can still recover each original VoIP packet with only the multiplexed packets 200 sent at times T and T+6$t_p$. This still provides a ⅔ reduction in the number of multiplexed packets 200 which need to be transmitted. (i.e., only 1 out of every 3 multiplexed packets 200 need be transmitted).

In FIG. 1, compression module 117 decides which multiplexed packets 200 to eliminate and which multiplexed packets 200 to send. Typically, if it is determined that only one of every three multiplexed packets 200 need to be sent, that is two out of every three multiplexed packets 200 are being eliminated, this will be done in a sequential manner (i.e., one sent, two withheld, one sent, two withheld, etc.). If the rate of data loss is higher, that is more than 50% selective packet loss, then the number of multiplexed packets 200 being sent can increase, for example, by sending two out of every three packets instead of one out of every three packets. The multiplexed packets 200 that can be eliminated are dependent, of course, upon the number N of redundant payloads in each multiplexed packet 200. In the worst case scenario, i.e., an extremely noisy environment with a very high packet loss rate, all multiplexed packets 200 may need to be transmitted, thereby sacrificing compression for robustness.

The packet loss ratio can be determined by a feedback mechanism which provides a feedback token to the transmitting terminal which lets the transmitting terminal know how many multiplexed packets 200 that it has sent were successfully received at the receiving terminal. The decision to increase or decrease the amount of multiplexed packets 200 which are eliminated is based upon this feedback token.

Figure 4:
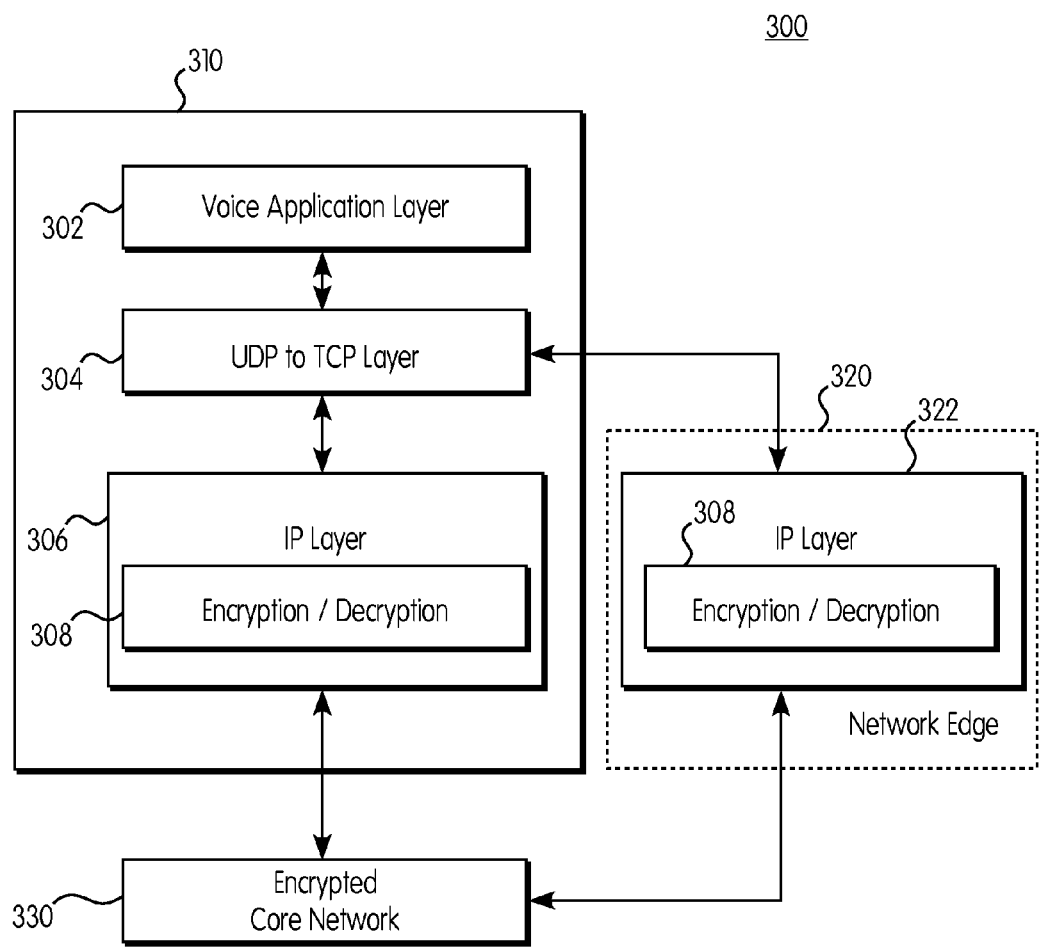
FIG. 4 is a high-level, schematic diagram depicting a configuration of an exemplary software stack of a terminal of the system of FIG. 1.

FIG. 4 is a high-level, schematic diagram depicting an exemplary configuration of a software stack 300 of the system 100. In one embodiment, the stack 300 includes a software stack 310 of the terminal 110, a software stack of an optional network edge 320, and a software stack of an encrypted core network 330. The software stack 310 generally includes a voice application layer 302, a UDP layer 304, an IP layer 306, and an optional encryption/decryption layer 308. Multiplexing/demultiplexing of payloads of the current and preceding packets, as well as the decision on which multiplexed packets 200 to withhold from transmission, may be performed at the IP layer 306 of the software stack 310, or, alternatively, at an IP layer 322 of the network edge 320.

The software stack 310 may interface with the network edge 320. In the depicted embodiment, the encryption/decryption layer 308 is associated with the stack 310. Alternatively, the encryption/decryption layer 308 may be associated with the network edge 320, for example, in alternative embodiments where the stack 310 interacts with the encrypted network layer 330 via the network edge 320 (shown with broken lines). In the described embodiments, the encryption/decryption layer 308 operates with the IP-based packets in which payloads have been multiplexed at the IP layer 306 of the stack 310 or, alternatively, at the IP layer 322 of the network edge 320. Such packets are compatible with encryption/decryption techniques that are presently used in VoIP communication systems, such as HAIPE.

Figure 5:
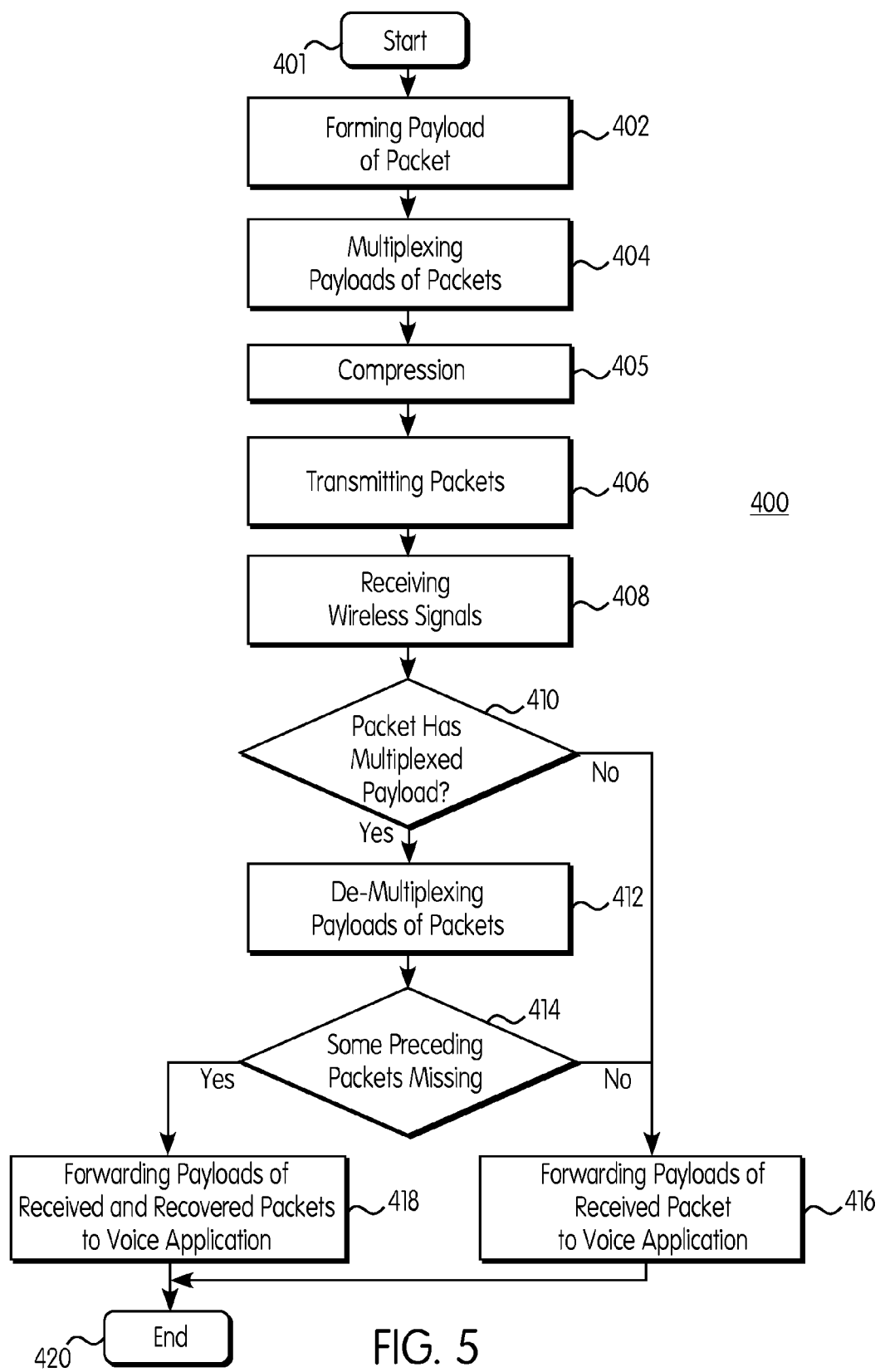
FIG. 5 is a flow diagram illustrating a method of wireless VoIP communications in accordance with one embodiment of the present invention.

FIG. 5 is a flow diagram illustrating a method of wireless VoIP communications in accordance with one embodiment of the present invention. In particular, FIG. 5 depicts a sequence 400 of method steps performed to facilitate reliable wireless communication links between transmitting and receiving terminals of the system of FIG. 1 experiencing a high rate of packet loss. In some embodiments, these method steps are performed in the depicted order. In alternate embodiments, at least two of these method steps may be performed contemporaneously or in a different order.

Illustratively, the method steps of the sequence 400 are presented in an order that corresponds to a transmission of a voice message from one terminal (e.g., terminal $110_1$) to another terminal (e.g., terminal $110_k$). However, in system 100, such communications, as well as half-duplex or duplex communications, may simultaneously be performed between any and all of the terminals $110_X$. For clarity, the method is discussed in reference to the method steps performed during transmission and reception of one packet, which is referred to herein as a packet X. One skilled in the art will readily appreciate that such method steps are cyclically repeated (not shown) for the packets of a data stream constituting the related voice message. One skilled in the art will further readily appreciate that the method steps of sequence 400 may be employed in other embodiments of the invention, including, but not limited to, wired and fiber-optic terrestrial or undersea networks supporting IP-based voice or data communications, as well as in the networks having a combination of wireless, wired or fiber-optic links, and further including free space optical communication networks, such as a laser-based communication network.

In the depicted embodiment, processing of the voice data fields of the packets and encryption/decryption of the packets are performed using resources of the software stack 310 of the terminal 110. Alternatively, at least a portion of such functions may be performed at the network edge 320 (discussed in reference to FIG. 4 above).

The method starts at step 401 and proceeds to step 402. At step 402, at a transmitting terminal (e.g., terminal $110_1$), the payload of the packet X is formed. In particular, the voice application 108 digitizes a voice message and then payloads for a plurality of packets needed to transmit the voice message are generated using the respective programs of the software stack 310.

At step 404, the payload of the packet X is multiplexed with copies of payloads of the preceding N packets and placed into a multiplexed packet 200. During processing of the preceding packets, such copies were stored in a buffer of payloads (buffer 112). The payload of the packet X and copies of the payloads of preceding packets form the data fields 204 and $206_1$-$206_N$, respectively, of a multiplexed packet 200 to be transmitted to a receiving terminal. A copy of the payload of the packet X is stored in the buffer, where it replaces a copy of the least recent packet.

At step 405, the decision is made regarding which of multiplexed packets 200 to transmit and which of multiplexed packets 200 to withhold, based on the value of N and the current rate of packet loss. Multiplexed packets 200 which are withheld from transmission are discarded, while multiplexed packets 200 which are to be transmitted are sent to step 406. At step 406, the multiplexed packet 200 containing the payloads multiplexed during step 404 and otherwise compliant with requirements of the communication protocol of the network 120 (e.g., VoIP encrypted using HAIPE), in a form of a wireless signal is transmitted to a receiving terminal. At step 408, the wireless signal is received at the receiving terminal (e.g., terminal $110_k$), where multiplexed packet 200 is converted from a radio frequency (RF) domain in the digital domain.

At step 410, the method queries if the received packet contains multiplexed payloads (i.e., if the packet is a multiplexed packet 200 and contains fields $206_1$-$206_N$). If the query of step 410 is negatively answered, the method proceeds to step 416 where the original VoIP packet with the payload of the packet (i.e., content of the field 204) is reconstructed and forwarded to the voice application 108. If the query of step 410 is affirmatively answered, the method proceeds to step 412 where contents of the payloads' fields of the received multiplexed packet 200 are de-multiplexed.

Note that at the receiving terminal, it is not necessary to implement any special processing to implement the compression aspect of the invention. The receiving terminal simply takes any incoming multiplexed packets 208 and determines, after demultiplexing, if all payloads can be recovered. The receiving terminal has no knowledge, nor is any necessary, whether the missing multiplexed packets 200 were lost during transmission or were never sent.

At step 414, the method queries if some or all of the N preceding packets have not been received by the receiving terminal (i.e., lost during in the communication channel). If the query of step 414 is negatively answered, the method proceeds to step 416, where the original VoIP packets are reconstructed from the payload of the received multiplexed packet 200 and are forwarded to VoIP application 108. If the query of step 414 is affirmatively answered, the method proceeds to step 418 where the original VoIP packet corresponding to the received packets (i.e., with payload content of the field 204) and the reconstructed VoIP original packets constructs from the copies of payloads of the corresponding missing packets (i.e., packets with the payload contents of the respective fields $206_1$-$206_N$) are forwarded to VoIP application 108. At step 420, the method ends. Note that the optional encryption and decryption steps have been eliminated from the flow diagram of FIG. 5.

In operation, the method facilitates recovery of contents of lost preceding packets and, as such, facilitates VoIP communications over networks having high rates of packet losses, while still providing some degree of compression gain. Furthermore, the method is compatible with existing encryption/decryption schemes, including, but not limited to HAIPE, as well as with existing error cancellation methods and FEC techniques. Similarly, the method may also be used in wired and fiber-optic networks to increase reliability of information exchanges realized in a form of data packets (e.g., IP-based data packets).

Although the invention herein has been described with reference to particular illustrative embodiments, it is to be understood that these embodiments are merely illustrative of the principles and applications of the present invention. Therefore, numerous modifications may be made to the illustrative embodiments and other arrangements may be devised without departing from the spirit and scope of the present invention, which is defined by the appended claims.

The invention claimed is:

1. A method of information transfer in a packet-switched network comprising the steps of:
   intercepting the payload from the packet of a packet stream;
   creating a multiplexed packet containing said current payload and copies of N preceding payloads from said data stream;
   selecting a subset of said created multiplexed packets for transmission such that each original payload is contained in at least one selected multiplexed packet;
   transmitting said selected multiplexed packets;
   increasing the number of multiplexed packets selected for transmission as the rate of packet loss increases and decreasing the number of multiplexed packets selected for transmission as the rate of packet loss decreases; and
   adjusting N such that each payload appears in two or more multiplexed data packets selected for transmission;
   wherein compression is maximized when only 1/(N+1) multiplexed packets are selected for transmission.

2. The method of claim 1 wherein N is selected such as to create a trade-off between compression and robustness as the number of selected data packets increases or decreases respectively, based on the rate of packet loss in said network.

3. The method of claim 1 wherein said data stream is created by a VoIP application and further wherein $3 \leq N \leq 5$.

4. The method of claim 1 further comprising the step of encrypting each multiplexed packet selected for transmission using a HAIPE-compatible encryption protocol.

5. The method of claim 1 further comprising the step of receiving feedback regarding the current packet loss rate of said transmitted data packets, and adjusting the number of multiplexed packets selected for transmission based thereon.

6. The method of claim 1 wherein said network is a wireless, wired, or fiber-optic communication network or a combination thereof.

7. The method of claim 1 wherein said creating and selecting steps are performed at an IP layer of a transmitting or receiving edge of the network and at the network core.

8. The method of claim 1 wherein at a receiving edge of the network performs the steps of:
   de-multiplexing a received multiplexed packet, producing N+1 packet payloads;
   adding headers to said N+1 packet payloads to produce N+1 original packets from said packet stream; and
   selectively forwarding said original packets from said packet stream to a recipient terminal or application.

9. The method of claim 1 wherein said network is HAIPE-compatible.

10. A system for providing communication over a packet-switched network, said system including a computer having software installed thereon, said software comprising:
    an application, said application outputting packets for transmission over said network and inputting packets received from said network;
    a buffer for storing N data payloads output from said application;
    a mux/demux module for creating multiplexed packets for transmission, said data packets containing the current packet payload and N preceding packet payloads from said application, and for demultiplexing said received multiplexed packets;
    a compression module for selecting a subset of said created multiplexed packets such that each packet payload is contained in at least one multiplexed packets selected for transmission;
    said compression module increases the number of multiplexed packets selected for transmission as the rate of packet loss in said network increases and decreasing the number of multiplexed packets selected for transmission as the rate of packet loss in said network decreases; and
    a communication module for transmitting said multiplexed packets selected for transmission over said network and for receiving multiplexed packets transmitted from another system;
    wherein N is adjusted such that each data payload appears in two or more multiplexed packets selected for transmission;
    wherein N is set such that said system achieves higher compression gain when the rate of packet loss in said network is low and achieves robustness at the cost of compression gain when the rate of packet loss in said network is high; and
    wherein said compression gain is maximized when only 1/N+1 multiplexed packets are selected for transmission.

11. The system of claim 10 wherein said compression module receives feedback regarding the current packet loss rate of said transmitted data packets, and adjusts the number of multiplexed packets selected for transmission based thereon.

12. The system of claim 10 wherein said application is a VoIP application and further wherein $4 \leq N \leq 6$.

13. The system of claim 12 wherein N=5.

14. The system of claim 10 further comprising an encryption module for encrypting each transmitted multiplexed packet using a HAIPE-compatible encryption protocol.

* * * * *